United States Patent [19]

Arifuku et al.

[11] Patent Number: 5,282,183
[45] Date of Patent: Jan. 25, 1994

[54] POSITION DETECTING APPARATUS AND METHOD

[75] Inventors: Naoto Arifuku; Kenji Okuda, both of Saitama, Japan

[73] Assignee: Pioneer Electronic Corporation, Tokyo, Japan

[21] Appl. No.: 921,133

[22] Filed: Jul. 29, 1992

[30] Foreign Application Priority Data

Nov. 8, 1991 [JP] Japan ................... 3-321169

[51] Int. Cl.⁵ ............................................ G11B 17/22
[52] U.S. Cl. ........................ 369/36; 369/178; 369/191; 414/273
[58] Field of Search ............ 369/34, 36, 178, 191; 360/98.05, 98.06; 414/273; 187/130, 131

[56] References Cited

U.S. PATENT DOCUMENTS

| | | | |
|---|---|---|---|
| 3,968,888 | 7/1976 | Van Vliet | 414/273 |
| 4,191,981 | 3/1980 | Van Winkle | 369/34 |
| 4,683,989 | 8/1987 | Pillage et al. | 187/130 |
| 4,807,208 | 2/1989 | Geiger | 369/34 |
| 4,853,916 | 8/1989 | Tomita | 360/99.07 |
| 4,878,137 | 10/1989 | Yamashita et al. | 360/98.05 |
| 5,036,503 | 7/1991 | Tomita | 369/34 |
| 5,043,962 | 8/1991 | Wanger et al. | 369/36 |
| 5,101,387 | 3/1992 | Wanger et al. | 369/36 |

FOREIGN PATENT DOCUMENTS

| | | |
|---|---|---|
| 0285866 | 10/1988 | European Pat. Off. . |
| 0370722 | 5/1990 | European Pat. Off. . |
| 0384622 | 8/1990 | European Pat. Off. . |
| 0004720 | 1/1980 | Japan .................. 360/98.05 |
| 0175059 | 10/1984 | Japan .................. 360/98.05 |
| 0276169 | 12/1986 | Japan .................. 360/98.05 |

Primary Examiner—Richard A. Bertsch
Assistant Examiner—Howard R. Richman
Attorney, Agent, or Firm—Sughrue, Mion, Zinn, Macpeak & Seas

[57] ABSTRACT

The present invention relates to a position detecting apparatus for and method of detecting a position of a transport unit, wherein the transport unit is used to pick up a designated disk from a disk container containing a plurality of disks to transport the disk thus picked up to a disk playback unit. The present invention accumulates the number of pulses output by an encoder of the transport unit as the unit moves upward or downward along an encoder channel. The accumulated count is used as a position count for determining the position of the transport unit between the disk container and the playback unit. A second encoder generates a pulse train corresponding to the movement of the transport unit along the second encoder channel. The second encoder channel having a plurality of recesses spaced at a wider pitch than in the encoder channel. A comparison between the level of the pulse train generated by the second encoder and the odd or even number of accumulated pulses output by the encoder indicates whether or not pulse output has been missed. If it is determined that a pulse output has been missed, the transport unit is moved to a predetermined position, and the position count is reset to a number corresponding to the predetermined position.

14 Claims, 16 Drawing Sheets

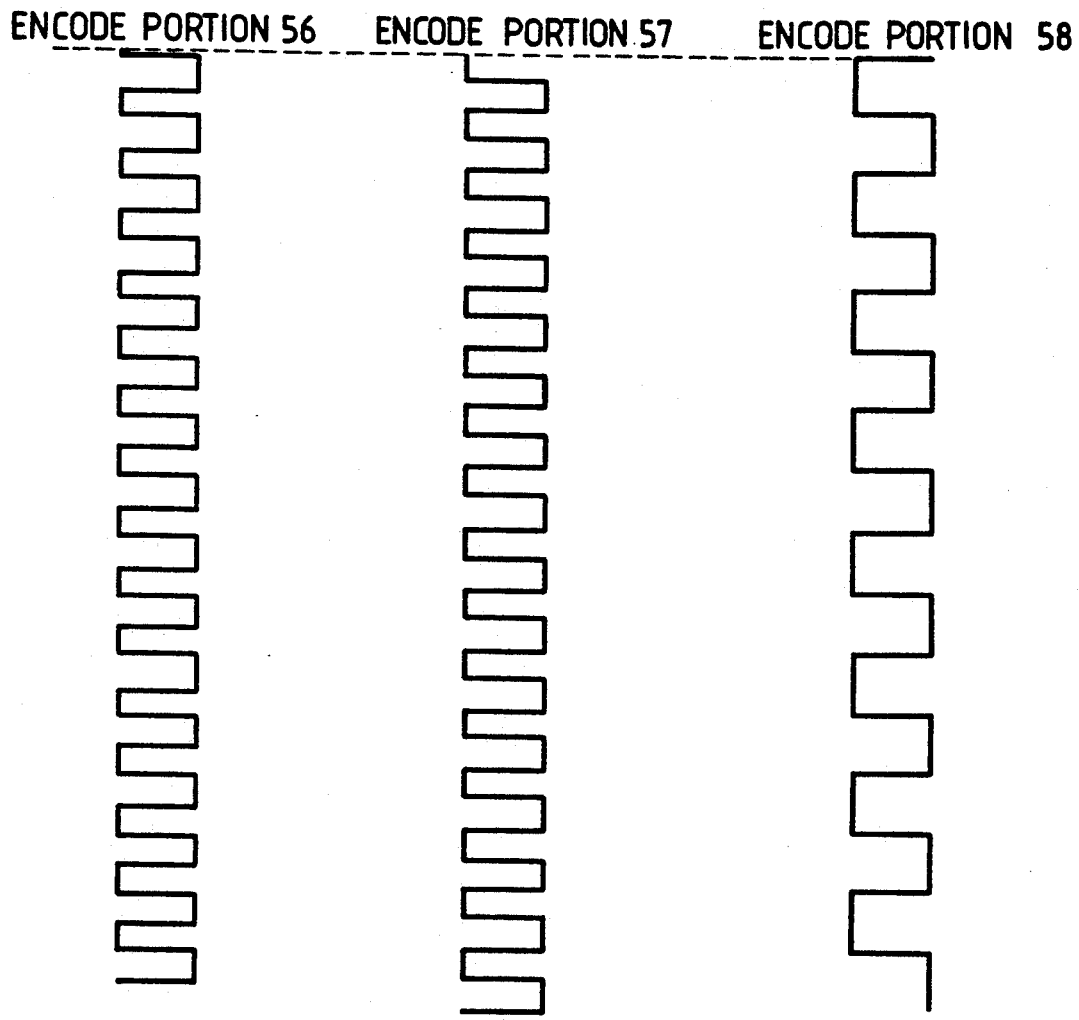

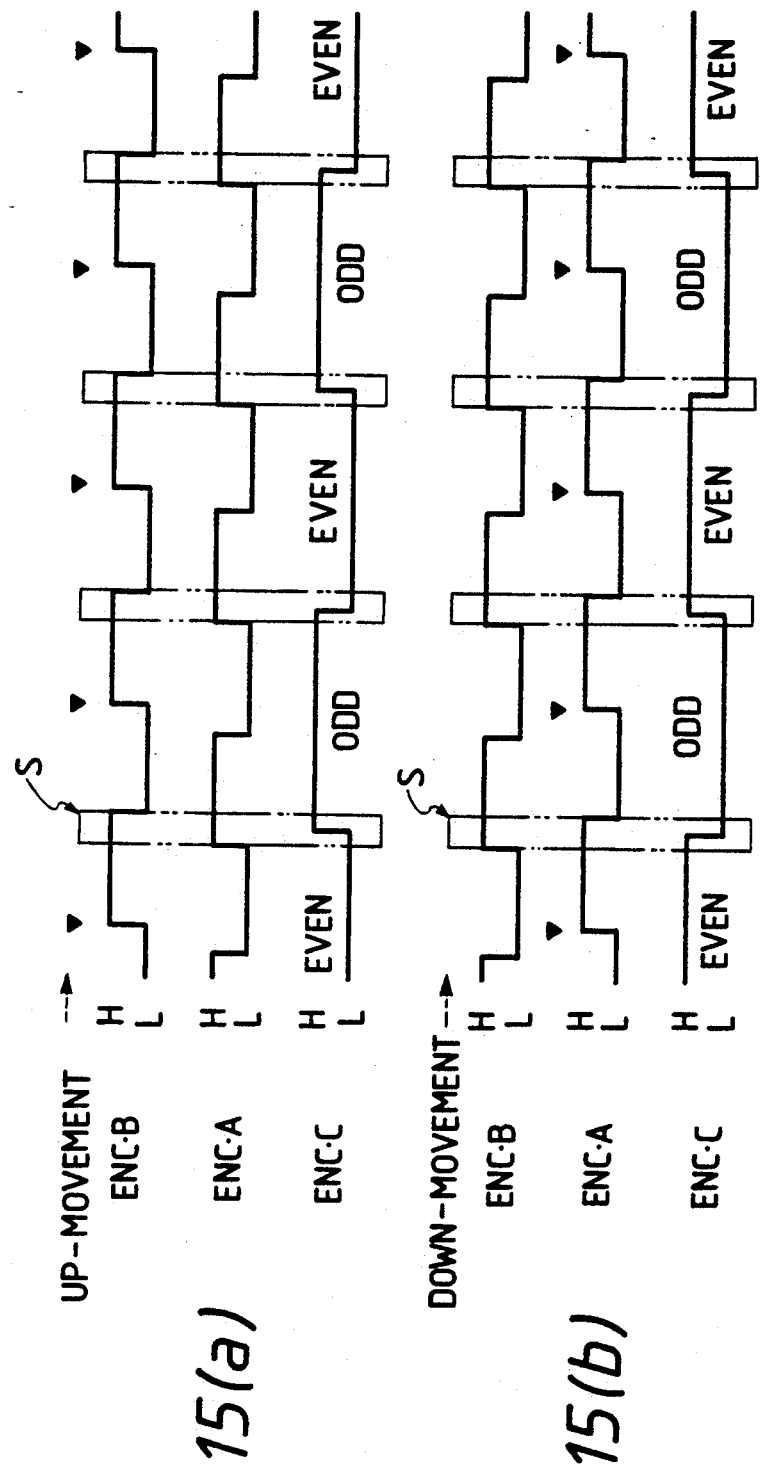

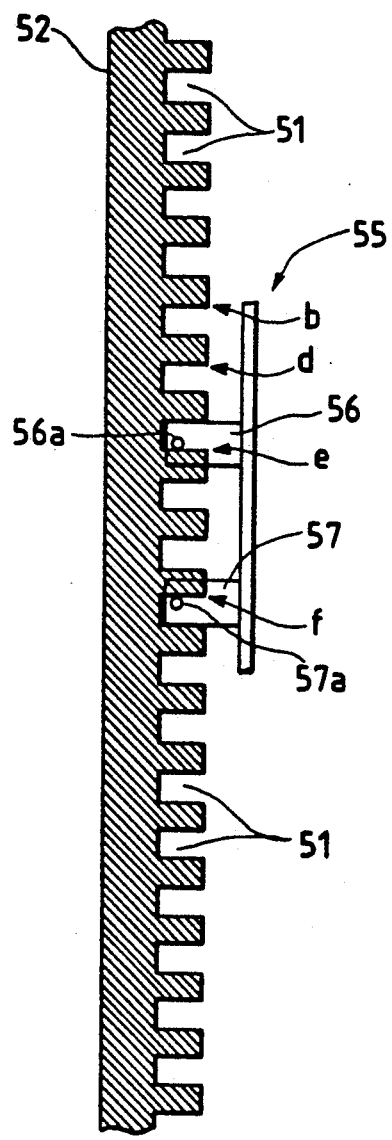
FIG. 19
PRIOR ART
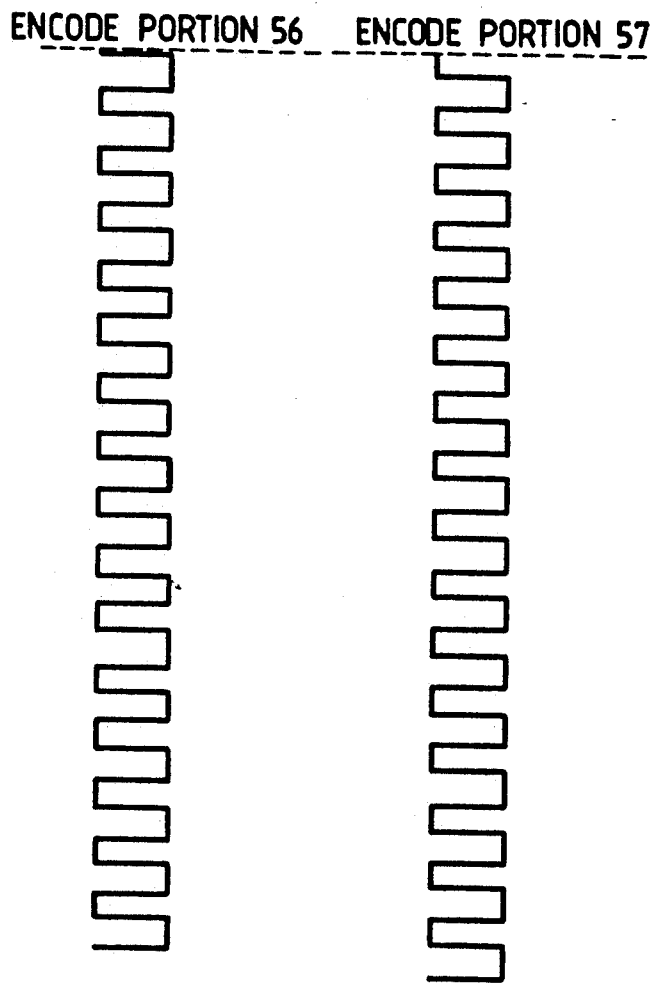
FIG. 20(a)
PRIOR ART
FIG. 20(b)
PRIOR ART

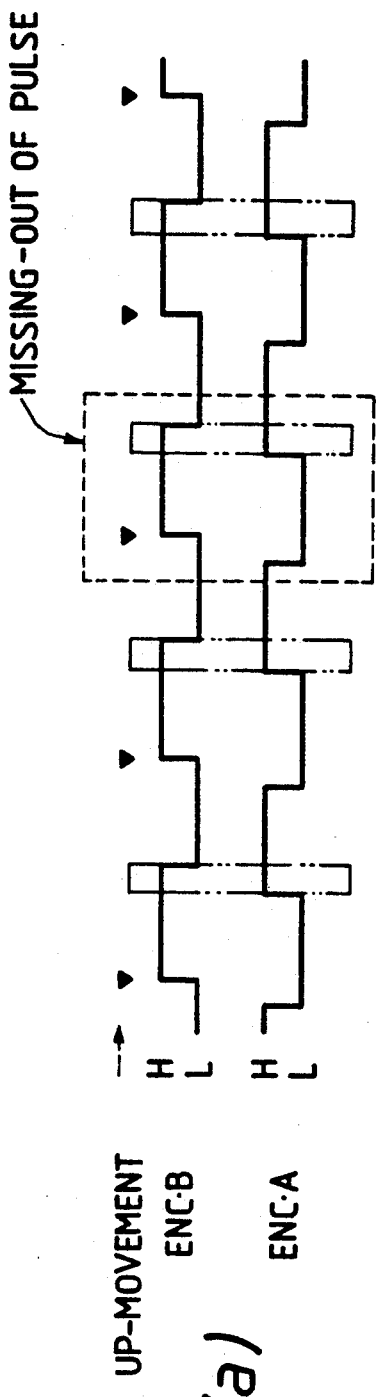
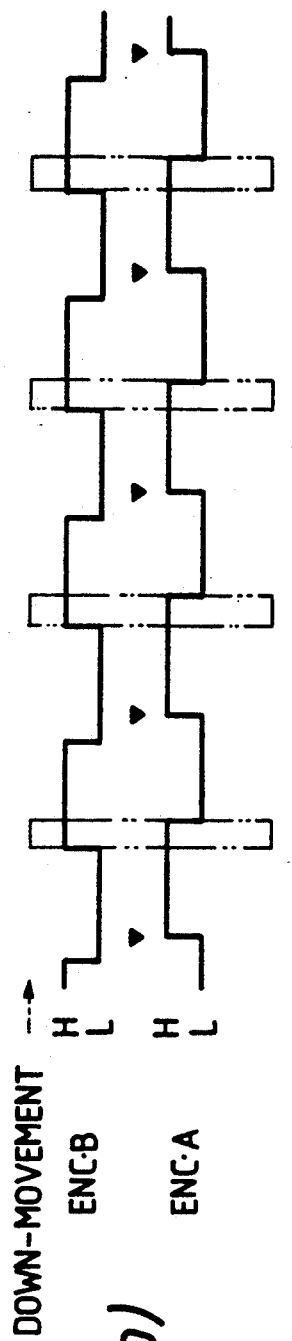
FIG. 22(a) PRIOR ART
FIG. 22(b) PRIOR ART

POSITION DETECTING APPARATUS AND METHOD

FIELD OF THE INVENTION

The present invention relates to a position detecting apparatus for and method of detecting a position of a transport unit, wherein the transport unit is used to pick up a designated disk from a disk container containing a plurality of disks and to transport the disk thus picked up to a disk playback unit.

DISCUSSION OF THE RELATED ART

In a laser KARAOKE system, a plurality of recording mediums, such as laser disks, compact disks, and the like, are stored in a container. An operator of the system selects a certain music piece contained on one of the recording mediums so that people can sing along with the music piece as it is being reproduced. When music pieces are requested sequentially, an operator must correctly input the desired disks corresponding to the requested music pieces to the system in succession. This manual input operation requires an operator well skilled in the manipulation of the system. An automatic change function of the disk player within the system executes the actual disk setting process for the operator.

During execution of the automatic change function, the disk number, disk side, and track number containing the desired music piece are designated by the operator using an operation key on an operation panel installed in the housing of the system, or by using an operation key of a remote control unit. Upon designation, a transport unit within the system picks up the disk bearing the designated disk number from the disk container and transports the disk to a disk playback unit.

An example of the disk player having the transport unit thus described is shown in FIG. 16. As shown, two disk playback units 2A and 2B are respectively provided off to one side in the upper and lower portions of the housing 1. A retractable main tray 3 is provided in the upper portion of the housing 1. When the main tray 3 is retracted into the housing 1, it is located directly under the upper disk playback unit 2A.

A sub-tray 4, located within the main tray 3, is movable in the direction orthogonal to the direction of movement of the main tray 3, as shown by the direction arrows in FIG. 16. That is, the sub-tray 4 can move from a position under the disk playback unit 2A at one side of housing 1 to the other side of housing 1. A disk container 5, provided between the upper and lower disk playback units 2A and 2B, contains additional sub-trays 4 that are stacked on one another. These sub-trays 4 may contain previously loaded disks or may be empty. The sub-trays are stacked in such a manner that they remain retractably movable in the horizontal direction.

A transport unit 6 transport the sub-trays 4 between the disk playback units 2A and 2B and the main tray 3 or the disk container 5. A space is provided in the housing 1 to allow such movement of the transport unit 6 at a side opposite the playback units 2A and 2B. A drive mechanism including a rack 7, a pinion 8, and the like, is used to vertically move the transport unit 6 along a guide 6a.

During this vertical movement, the transport unit 6 is positioned through the cooperation of an encoder channel 50 extending along the guide 6a and an encoder 55 installed on the transport unit 6. Specifically, the encoder channel 50 includes a plurality of recesses 51 formed in an encoder portion 52 thereof, as shown in FIG. 17(b).

The encoder 55 includes encoder sensors 56 and 57, which are spaced by a prescribed distance, as shown in FIG. 17(a). As the transport unit 6 moves along guide 6a, each encoder sensor passes over the encoder portion 52 in a state that it straddles the encoder portion 52. In operation, the encoder 55 moves along the encoder channel 50 such that every time an encoder sensor 56 or 57 passes over a recess 51 of the encoder portion 52, the sensor generates an output pulse and a counter (not shown) increments a count. When the count is coincident with a designated address, the moving transport unit 6 is stopped. This designated address may, for example, correspond to the position of the disk designated by the operator as stored in the container 5.

The transport unit 6, as shown in FIG. 18, is provided with an engaging piece 10, which is horizontally movable along a guide member 9. For example, when the sub-tray 4 is to be pulled out of the main tray 3 for loading onto the transport unit 6, the engaging piece 10 moves toward the main tray 3 until it engages with a protruded part 4a of the sub-tray 4. Then, the engaging piece 10 moves away from the main tray 3, and the sub-tray 4 is thus transferred from the main tray 3 to the transport unit 6. In the reverse transfer operation, the sub-tray 4 is pushed toward the main tray 3 in a state that the engaging piece 10 engages the protruded part 4a. After the sub-tray 4 is transferred to the main tray 3, the engaging piece 10 is disengaged from the protruded part 4a. Thereafter, the engaging piece 10 is separated from the sub-tray 4 and is moved away from the main tray 3.

In the disk player thus constructed, when the operator enters an instruction to eject the main tray 3 by operating an operation key on an operation panel (not shown) installed in the housing surface, or by operating an operation key of a remote control unit (also not shown), the main tray 3 bearing the sub-tray 4 placed thereon is pushed out of the housing 1 as shown in FIG. 16. After an operator places a disk on the sub-tray 4 and enters a loading instruction using the operation key, the main tray 3 is retracted into the housing 1.

Upon completion of the retraction operation, the transport unit 6 moves along the guide 6a up to the main tray 3. The sub-tray 4 in the main tray 3 is pulled toward the transport unit 6 through the action of the engaging piece 10 in the manner described above.

The transport unit 6, after it has received the sub-tray 4, is moved to either of the disk playback units 2A and 2B as designated by a control unit (not shown). When the movement of the transport unit ends, the sub-tray 4 is pushed into the disk playback unit 2A or 2B through the action of the engaging piece 10. Then the disk is played back by the designated playback unit.

At this time, if the other disk playback unit 2A or 2B is not being used, a sub-tray 4 contained in the disk container 5 may be transported by the transport unit 6 to that disk playback unit 2A or 2B, in the manner previously discussed. A disk thus transported is set for the next music piece playback operation. In this way, the disk player is ready to play back music pieces in successive order. The successive playback operation may also be facilitated by replacing an empty sub-tray 4 in the disk container 5 with a loaded sub-tray 4. This is achieved by transferring the empty sub-tray 4 from the container 5 onto the main tray 3 and ejecting the same.

The new sub-tray 4 loaded with a new disk can then be reset and loaded in the main tray 3, and the sub-tray 4 now having the new disk is transported to the other disk playback unit 2A or 2B for the next playback operation.

During a disk replace operation, an operation key for designating a disk replacement mode and an operation key for designating the address of the sub-tray 4 having the disk to be replaced are activated by the operator. Under control of the control unit, the transport unit 6 moves to the position of the designated sub-tray 4 in the disk container 5 and retrieves the sub-tray 4 from the disk container 5. The transport unit 6 bearing the sub-tray 4 then moves upward to the main tray 3 and transfers the sub-tray 4 to the main tray 3. After the main tray 3 receives the sub-tray 4, the main tray 3 is ejected from the housing 1. At this time, the operator may replace the disk in the sub-tray 4 with a new one. Once a loading instruction is entered, the main tray 3 is retracted into the housing 1 to perform the loading operation. During the loading operation, the transport unit 6 receives the sub-tray 4 from main tray 3 and moves downward to the designated position in the disk container 5, where the new disk is to be stored.

The above sequence of operations can be repeated by merely designating a disk number, disk side, and music number successively by operating an operation key installed on the operation panel or the remote control unit.

Thus, using the disk player described above, a manual disk replacement operation is no longer required. Such operation requires an operator to open the door of the housing 1 and manually replace a disk in the container with a new one. Further, a disk can be reliably set to the position specified by the address assigned to the disk.

In the disk player described above, the position of the transport unit 6 is detected in the following manner.

The encoder channel portion 52 of the encoder channel is constructed as shown in FIG. 19. The light-receiving parts 56a and 57a of the encoder sensors 56 and 57 of the encoder 55 are distanced apart such that when the light-receiving part 56a is positioned at the leading edge e of a recess 51 (with respect to an upward movement of the encoder 55), the light-receiving part 57a is at the trailing edge f of another recess 51.

Pulse signals are output from the encoder sensors 56 and 57 using light-receiving parts 56a and 57a, respectively, as they pass over the recesses 51. Specifically, when the encoder sensor 56 passes over a recess 51, the light receiving element 56a receives an optical signal from a light-transmitting element (not shown) positioned on a side of the recess 51 opposite the element 56a. The pulses thus output have waveshapes as shown in FIGS. 20(a) and 20(b). Hereinafter, the encoder sensors 56 and 57 will be, respectively, referred to as "ENC.A" and "ENC.B" for ease of explanation.

As stated above, the position of the transport unit is determined by counting the pulses output from either ENC.A or ENC.B using a counter and a control circuit (not shown), as the transport unit 6 moves along the encoder channel 50. The top position of the encoder channel 50 is associated with the position of the upper disk playback unit 2A. This position is assigned the lowest positional address (e.g., "0"). Conversely, the bottom position of channel 50 is associated with the position of lower playback unit 2B, and is assigned the greatest positional address. Thus, as the transport unit 6 moves upward along encoder channel 50, the output pulses generated by encoder sensors 56 or 57 are counted and used to decrease a count (hereinafter referred to as a "position count") used to determine the positional address of the transport unit 6.

The counting operation discussed above follows the operational flow depicted in FIG. 21. As an initial step, the direction of the vertical movement of the transport unit 6 is determined by the control unit (step 601). If it is determined that the transport unit 6 is moving upward along guide 6a, a pulse is generated every time ENC.B passes over one of the recesses 51, as shown in FIG. 22(a). Once the leading edge of this pulse is detected (step 602), position count (N) is decremented by 1 in the counter (step 603). When the count is coincident with a designated address (e.g., position of a designated disk stored in container 5), the upward movement of the transport unit 6 is stopped. The stop position of the transport unit 6 is indicated by a pulse portion enclosed by a double-dotted dashed line in FIG. 22(a).

If the transport unit 6 is moving downward, a pulse is generated every time ENC.A passes over recess 51, as shown in FIG. 22(b). Once the leading edge of this pulse is detected (step 604), the position count (N) is incremented by the counter (step 605). When the position count (N) is coincident with a designated address, the motion of the transport unit 6 is stopped. The stop position of the transport unit 6 is also indicated by a pulse portion enclosed by a double-dotted dashed line in FIG. 22(b).

The position detecting method discussed above has a problem in that, when an external force, such as vibration, is applied to the disk player, a pulse fails to be output by ENC.A or ENC.B, as shown by the dashed line in FIG. 22(a). Under this condition, the position count is not coincident with the actual address of the transport unit 6, so that the detected position of the transport unit 6 is not the actual position.

To overcome the above problem, there has been proposed a position detecting method based on the flow chart shown in FIG. 23. In the flow chart, when the transport unit 6 rises along guide 6a, the position detecting process proceeds in the order of numbered paths ①, ②, ③, and ④. The pulse edge first detected in the rising or upward movement of the transport unit 6 is the trailing edge of the ENC.A pulse. When the trailing edge of the ENC.B pulse is detected, flag A is reset to "0" (flag A = "0") and flag B is set to "1" (flag B = "1"). These flags are used for indicating that the preceding leading edge detected corresponds to the pulse generated by ENC.A or ENC.B. That is, when flag B = "1," the preceding leading edge detected is that of the pulse output from ENC.B. Flags A and B can never be both "1" or "0" when indicating the detection of a leading edge. That is, if one flag is "0," the other is always "1" because the spacing between ENC.A and ENC.B (FIG. 17(a)) is such that the output pulses are always out of phase, as shown in FIGS. 20(a) and (b).

As described above, ENC.A and ENC.B output pulses as they pass over recesses 51 in the encoder portion 52 during the upward movement of the transport unit 6. As shown in FIG. 23, when the trailing edge of the pulse generated by ENC.A is detected by the control unit (steps 801, 802), flag A is set to "1" (flag A = "1") and flag B is set to "0" (flag B = "0") (step 803). The leading edge of the pulse output from ENC.B follows the trailing edge of the pulse output by ENC.A and is detected in step 804. If it is determined that flag A does not equal "1," flag B is reset to "0" (flag B = "0"), the position count (N) in the counter remains unchanged (step 808), and the edge of the next pulse is detected. If, however, flag A="1" (step 805), the position count (N) is decremented (step 806). After the position count is decremented by the counter, flags A and B are reset to "0" (flag A="0" and flag B="0") (step 807).

The leading edge of the pulse output by ENC.A arrives following the leading edge of the ENC.B. After detection of the ENC.A pulse (step 809), the state of flag B is determined (step 810). If flag B was reset to "0" (flag B="0"), the control unit sets flag A to "0" and detects the edge of the next pulse (step 813).

Following the leading edge of the pulse output by ENC.A, the trailing edge of the pulse output by ENC.B appears and is detected in step 814. Then flag A is set to "0," flag B is set to "1, " and the edge of the next pulse is detected in step 815.

Thus, in accordance with the proposed method of FIG. 23, as the transport unit 6 rises along guide 6a, flag A is set to "1" and flag B is reset to "0" every time the trailing edge of the pulse output by the ENC.A is detected (numbered path ②). The position count (N) is only decremented when flag A="1" and when the leading edge of the pulse output by the ENC.B is detected. The rising movement of the transport unit 6 is stopped when the position count (N) is coincident with a designated address. In the downward movement of transport unit 6, a similar sequence of process steps is executed in the order of numbered paths ④, ③, ②, and ①.

In the position detecting method thus described, the position count (N) is incremented and decremented depending on whether the edge of the pulse previously detected was output by ENC.A or ENC.B. Thus, when an external force, such as a vibration, causes the ENC.B to miss an output pulse, a missing pulse can be detected.

However, when light-receiving elements 56a or 57a do not properly detect light transmitted from their corresponding light-transmitting elements as a result of, for example, dust that collects in recesses 51, a pulse output from either sensor 56 or 57 is missed as shown in FIG. 22(a). As a result, the position count (N) is not coincident with the proper positional address of the transport unit 6, and thus the control of the transport unit 6 is not accurately performed.

SUMMARY OF THE INVENTION

An object of the present invention is to overcome the foregoing and other problems by providing a position detecting apparatus and method which can be used to reliably detect the position of a transport unit in a disk player or the like.

To achieve the above and other objects, there is provided a position detecting apparatus comprising: position detecting means, provided in parallel with an encoder channel having a plurality of recesses arrayed at prescribed intervals, for generating a periodic binary coded signal in synchrony with the prescribed intervals as the position detecting means moves along said channel; a counter means for counting the number of recurrences of a specific phase point of said binary coded signal, and for storing the number as a position count representative of the position of said position detecting means along said channel; pulse train generating means for generating a train of pulses whose levels are alternately inverted in synchrony with the recurrences of said specific phase point of said binary coded signal; and check means for checking whether or not the level of a pulse within said pulse train is coincident with the position count stored in said counter means, wherein when the coincidence is determined, the position count is a valid representation of the position of the position detecting means along said encoder channel.

The position detecting apparatus and method of the present invention reliably detects the position of the transport unit by accumulating the binary coded signals output as a position count by the position detecting means, and determining the position count as a valid indication of the position of the transport unit when the number of the position count corresponds to the level of the signal generated by the pulse train generating means. Thus, for example, when the transport unit is used for vertically moving a disk upward from a disk container to a playback unit in a disk player, an odd numbered position count may correspond to a high level output by the pulse train generating means. Accordingly, when the position count is an odd number, and the pulse train generates a high level output, the position count is a valid indication of the position of the transport unit as the unit moves upward in the disk player. Where the position count is found to be not valid, the transport unit is moved to a predetermined position, such as the top position of the encoder channel, which position is detected by a limit switch. Upon detection, the position count is reset to a value corresponding to the predetermined position. In this manner, the position count accurately represents the actual position of the transport unit. Thus, the control unit can then continue to move the transport unit toward the designated address by relying on the positional address of the transport unit as accumulated by the counter.

BRIEF DESCRIPTION OF THE DRAWINGS

FIGS. 7(a) through 7(c) show wave forms of the pulses output from the encoder unit shown in FIG. 4.

FIGS. 15(a) and 15(b) show timing diagrams of an encoder on the transport unit of the disk player during upward and downward movement.

FIG. 19 is a sectional view illustrating the encoder unit arranged in relation to the encoder channel shown in FIGS. 17(a) and (b).

FIGS. 20(a) and 20(b) show wave forms of the output pulses of the encoder unit shown in FIGS. 17(a) and (b).

FIGS. 22(a) and 22(b) show timing diagrams illustrating the output of the encoder during upward and downward movement of a transport unit used in the apparatus of FIG. 16.

DETAILED DESCRIPTION OF THE PREFERRED EMBODIMENTS

Figure 1:
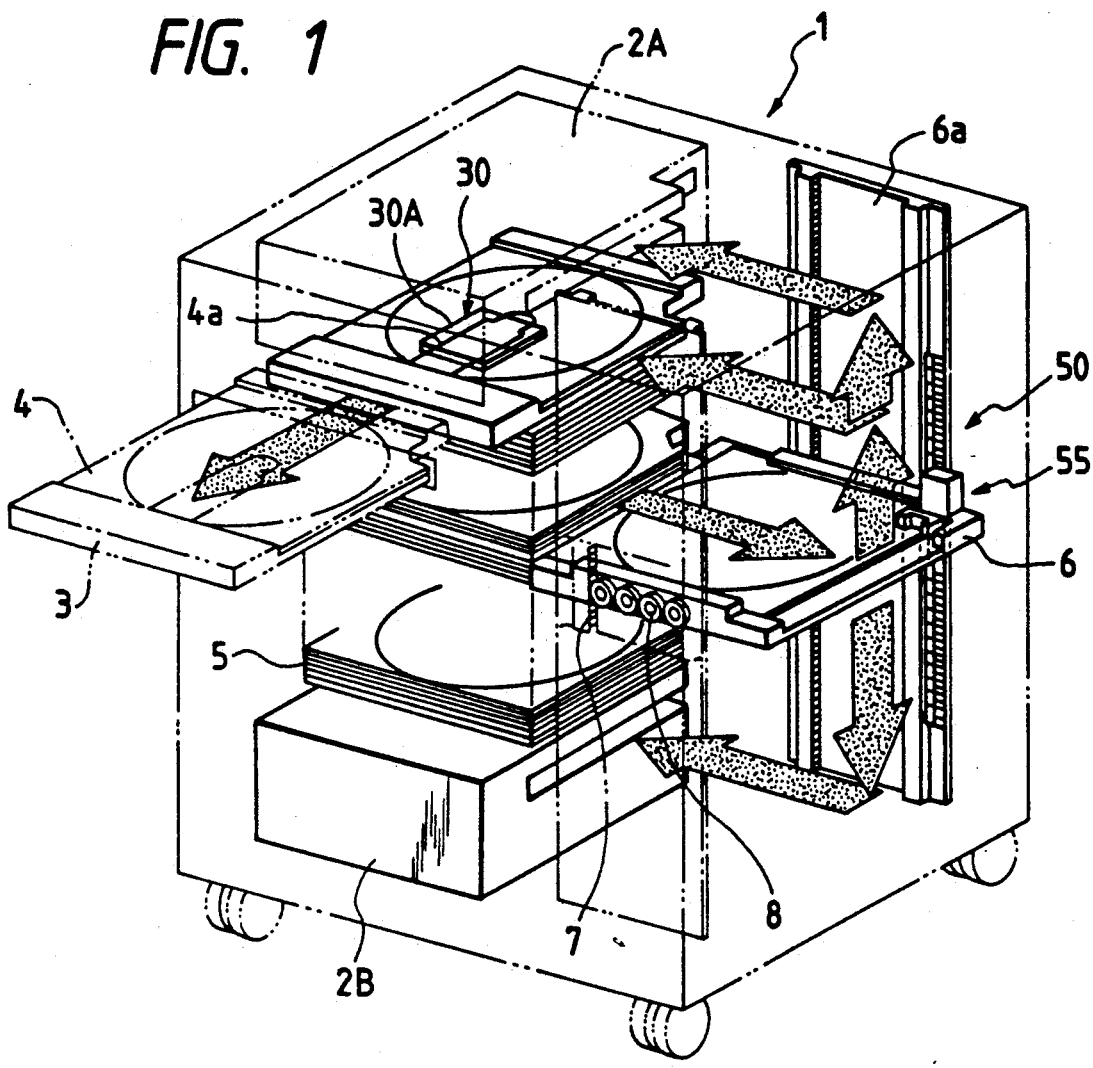
FIG. 1 is a perspective view showing a disk player using a position detecting apparatus according to the preferred embodiment of the present invention.

The preferred embodiments of a position detecting apparatus according to the present invention will be described in detail with reference to the accompanying drawings. In the drawings, like reference numerals are used for designating the same or equivalent elements.

Figure 12:
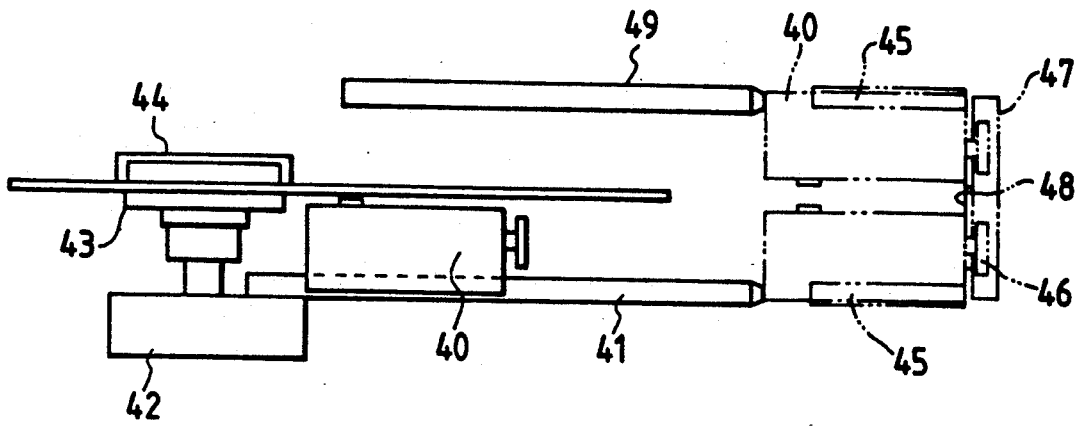
FIG. 12 is a side view of the pickup device of the disk player in FIG. 1.

FIG. 1 illustrates a perspective view of a disk player according to an embodiment of the present invention, wherein at one side of the disk player, two disk playback units 2A and 2B are provided in the upper and lower portions of housing 1. Each of the disk playback units 2A and 2B is provided with a single pickup, which will be described later, as shown in FIG. 12. A retractable main tray 3 is provided in the upper portion of the housing 1 directly below playback unit 2A. A sub-tray 4, installed in the main tray 3, is movable in a direction orthogonal to the direction of the movement of the main tray 3, as shown in FIG. 1.

Figure 2:
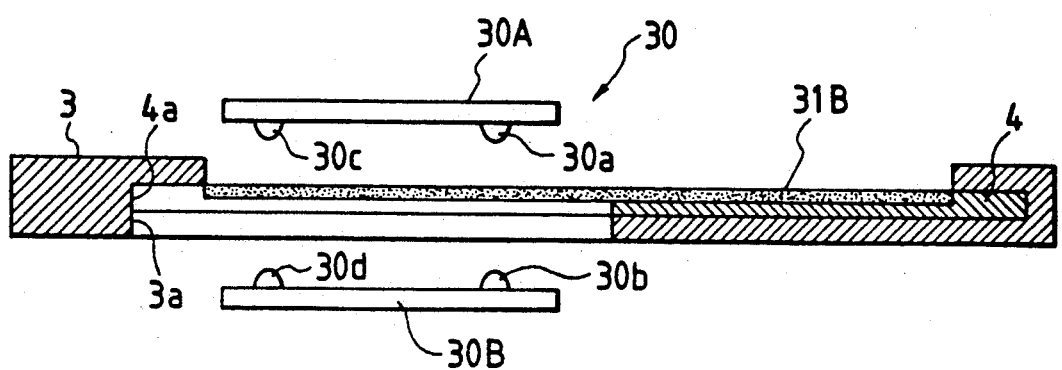
FIG. 2 is a cross sectional view illustrating a layout of an optical sensor used in the disk player of FIG. 1.
Figure 3:
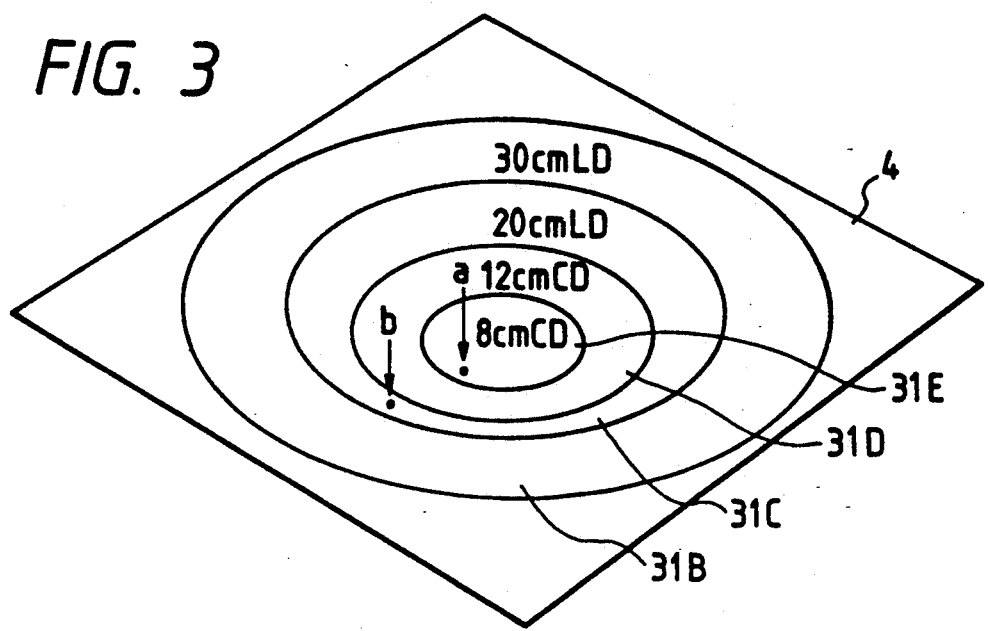
FIG. 3 is a perspective view illustrating how pairs of light-emitting elements and light-receiving elements, which are contained in the optical sensor shown in FIG. 2, are arranged in relation to different types of disks.

Under the upper disk playback unit 2A, as shown in FIG. 2, an optical disk-type sensor (referred to hereinafter as a "sensor") 30 having a light-receiving part 30A and a light-emitting part 30B is disposed such that the main tray 3 is located between the light-receiving part 30A and the light-emitting part 30B. The light-receiving part 30A includes light-receiving elements 30a and 30c. Similarly, the light-emitting part 30B includes light-emitting elements 30b and 30d. A disk contained in the sub-tray 4 movably provided on the main tray 3 is disposed relative to the optical sensor 30, as shown in FIG. 3.

As shown, the light-receiving element 30a and the light-emitting element 30b are disposed above and below a point a on the circumferential part of a CD (compact disk) 31E having a diameter of 8 cm. The light-receiving element 30c and the light-emitting element 30d are similarly disposed above and below a point b on the circumferential part of a video disk 31C having a diameter of 20 cm.

A light beam emitted by the light-emitting part 30B passes through a clamping hole 4a in the sub-tray 4 and a hole 3a in the main tray 3, corresponding to the clamping hole 4a. Upon reception of the light beam, the light-receiving part 30A outputs signals indicative of reception of the light beam at points a, b, or both. The control unit, based on the signals output by the sensor 30, determines the type of disk loaded in accordance with the following table.

TABLE 1

| Point "a" | Point "b" | Disk Type |
| --- | --- | --- |
| 1 | 1 | Video Disk |
| 1 | 0 | Compact Disk |
| 0 | 0 | No Disk |

As shown, three possible determinations are presented:
  detection at both points a and b—video or laser disk (LD) is present;
  detection at point a—compact disk is present; and
  no detection—no disk is present.

Other disks designated by reference numerals 31B and 31D in FIG. 3, which are respectively 30 cm and 12 cm in diameter, may be determined using alternative methods, as is well known in the art.

Between the upper and lower disk playback units 2A and 2B, a container 5 is provided which retractably contains sub-trays 4 in a stacked state.

A space within the housing 1 allows a transport unit 6 to transport a given sub-tray 4 from a stacked position in the container 5 on one side of the housing to the other side of the housing opposite the stacked position.

Figure 16:
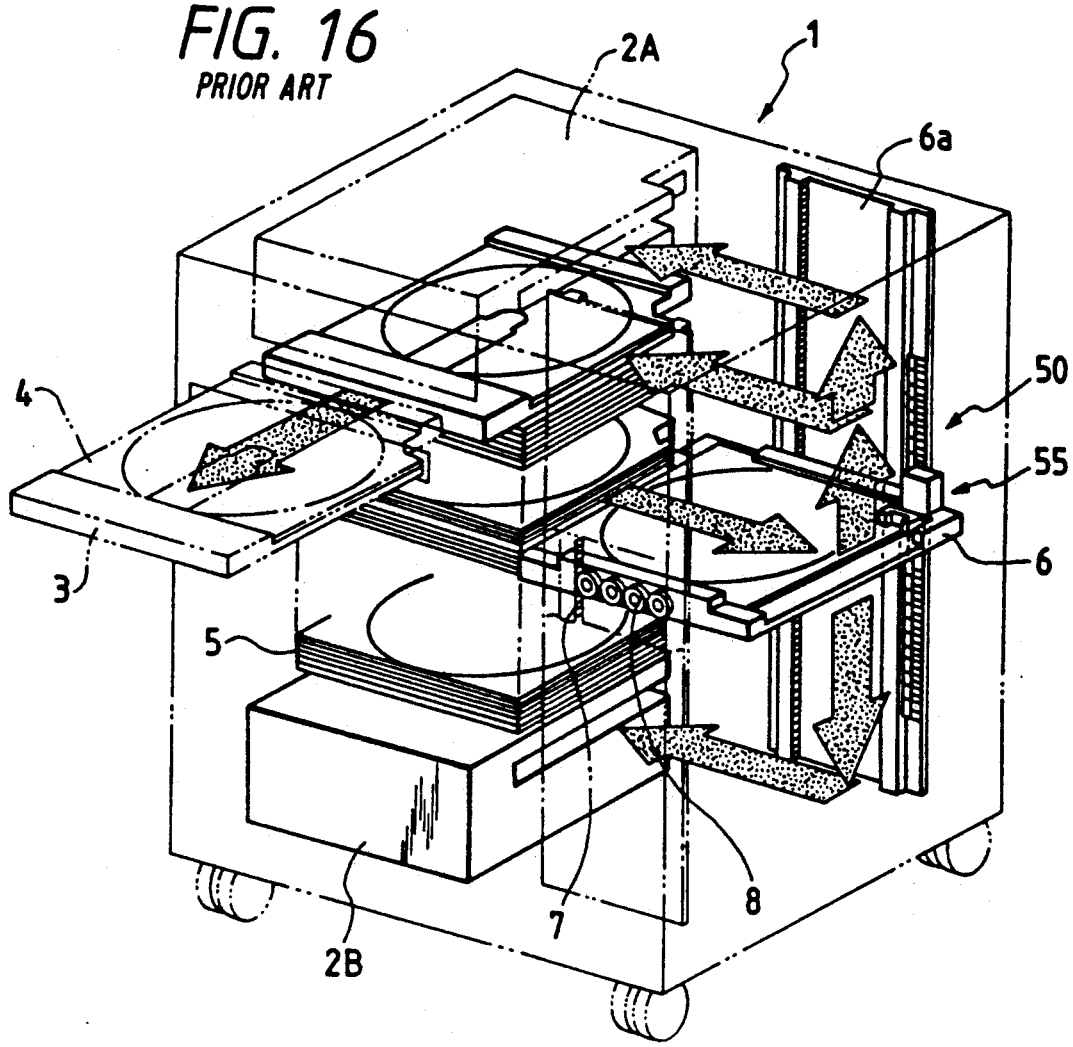
FIG. 16 is a perspective view showing a disk player using a conventional position detecting apparatus.

The transport unit 6, when moving vertically along a guide 6a, is positioned depending on the results obtained by the combination of encoder channel 50 and encoder 55, as previously described in connection with FIG. 16.

Figure 4:
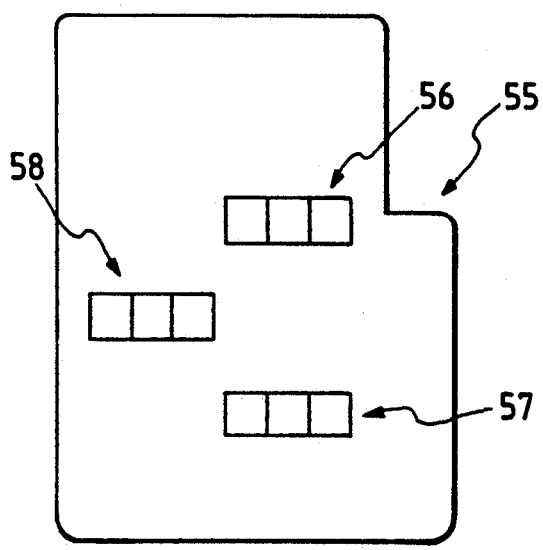
FIGS. 4 and 5 show front views of an encoder unit and an encoder channel, which cooperate to form the position detecting apparatus of the present invention.

As shown in FIG. 4, the encoder 55 includes encoder sensors 56 and 57, which are disposed so as to straddle the encoder portion 52, and also includes an encoder sensor 58, which is disposed so as to straddle encoder portion 54. The encoder sensors 56 and 57 are spaced by a prescribed distance.

Figure 5:
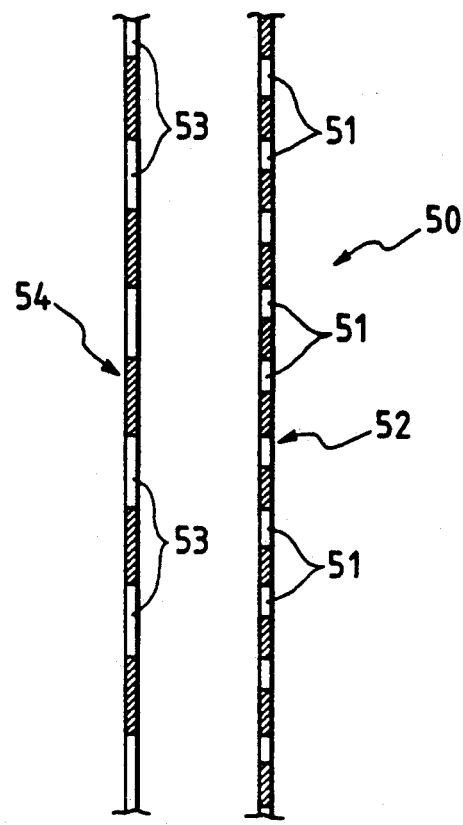

As shown in FIG. 5, the encoder channel 50 includes an encoder portion 52 with a plurality of recesses 51 and another encoder portion 54 with a plurality of recesses 53. The recesses 53 have a wider pitch than that of the recesses 51.

Figure 6A:
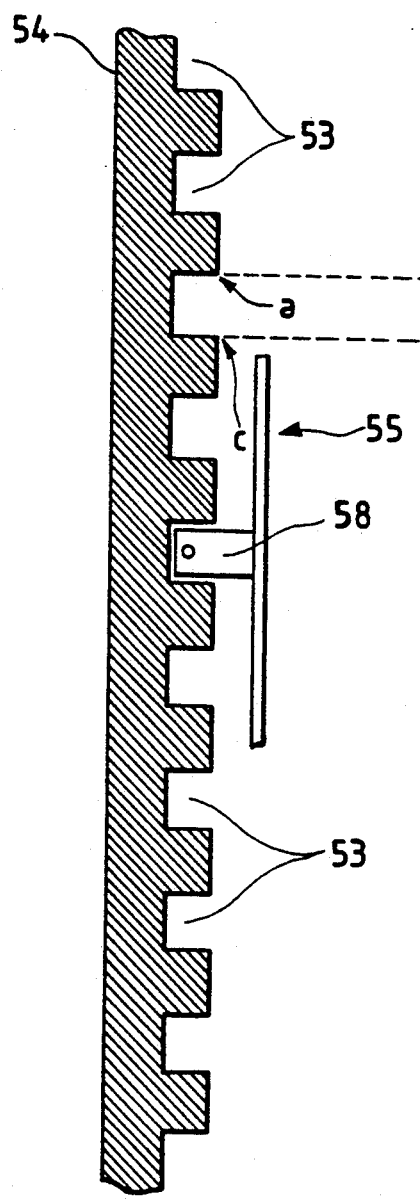
FIGS. 6(a) and 6(b) show sectional views illustrating how the encoder unit is arranged in relation to the encoder channel shown in FIG. 5.
Figure 6B:
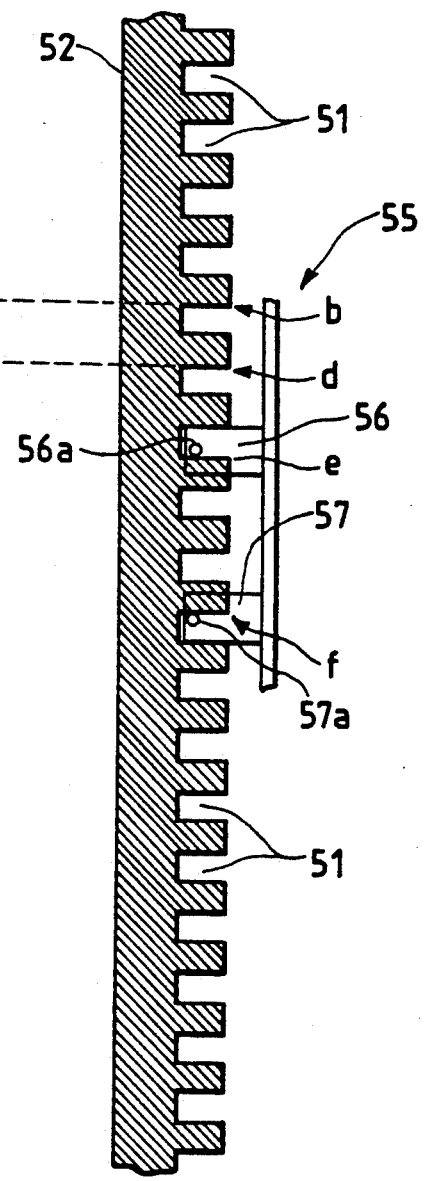

The encoder portions 52 and 54 are related to each other as shown in FIGS. 6(a) and (b). As shown, the trailing edge a of recess 53 of the encoder portion 54 is in synchrony with the trailing edge b of the recess 51 of the encoder portion 52. The leading edge c of the recess 53 is in synchrony with the trailing edge d of the recess 51.

The light-receiving parts 56a and 57a of the encoder sensors 56 and 57 are relatively positioned such that when the light-receiving part 56a is positioned at the leading edge e of the recess 51, the light-receiving part 57a is at the trailing edge f of another recess 51.

The waveforms of the pulses output by the encoder sensors 56, 57, and 58 are shown in FIGS. 7(a), 7(b), and 7(c), respectively. In the description to follow, the terms "ENC.A," "ENC.B," and "ENC.C" will be used to refer to the encoder sensors 56, 57, and 58, respectively, for ease of explanation.

Figure 8A:
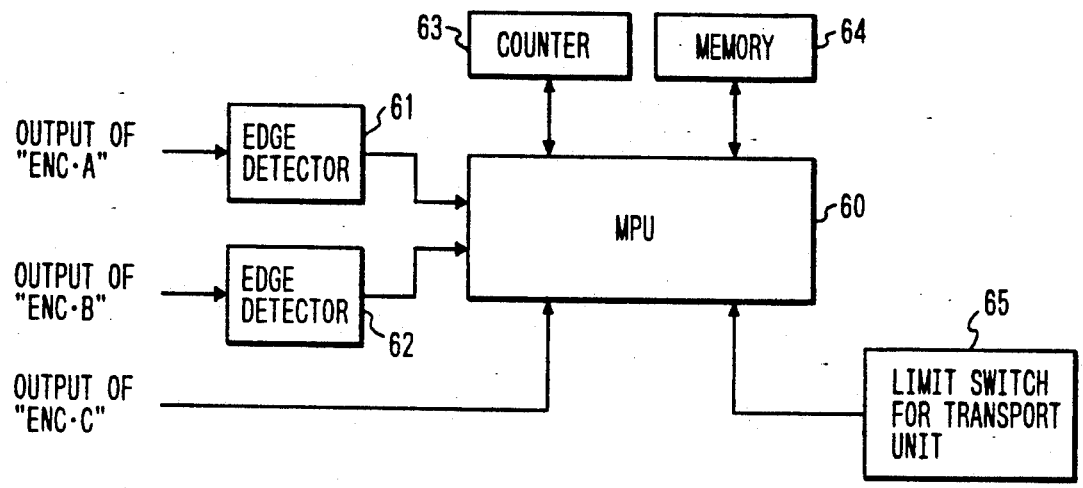
FIGS. 8(a) and 8(b) show block diagrams of the control system used to control the disk player of FIG. 1.

FIG. 8(a) is a block diagram showing the arrangement of a control system for controlling the operation of the transport unit 6 shown in FIG. 1. The edges of the pulses output by ENC.A and ENC.B are respectively detected by edge detectors 61 and 62. During the upward movement of the transport unit 6, the leading edge of the pulse output by ENC.B is detected by the edge detector 62. The detected result is accumulated by a counter 63. During the downward movement of the transport unit 6, the leading edge of the pulse output by ENC.A is detected by the edge detector 61. The detected result is also accumulated by counter 63.

A limit switch 65 detects the position of the transport unit 6 at the upper limit or the lower limit of movement within housing 1. As will be described in more detail herein, according to the present invention, when an output pulse has not been properly detected by sensors 56 or 57 (i.e., the pulse output is detected as missing), the transport unit 6 is moved up to the upper limit or down to the lower limit, depending on the original upward or downward movement of the transport unit detected. When the limit switch 65 detects that the transport unit 6 has reached the limit position, counter 63 is reset to indicate the position of the transport unit at the upper or lower limit position. In this manner, the position count (N) is reset to the actual known position of the transport unit 6 so that the position count can reliably indicate the position of the transport unit at all times.

A microprocessor unit (MPU) 60 is provided for controlling the components thus described.

Figure 8B:
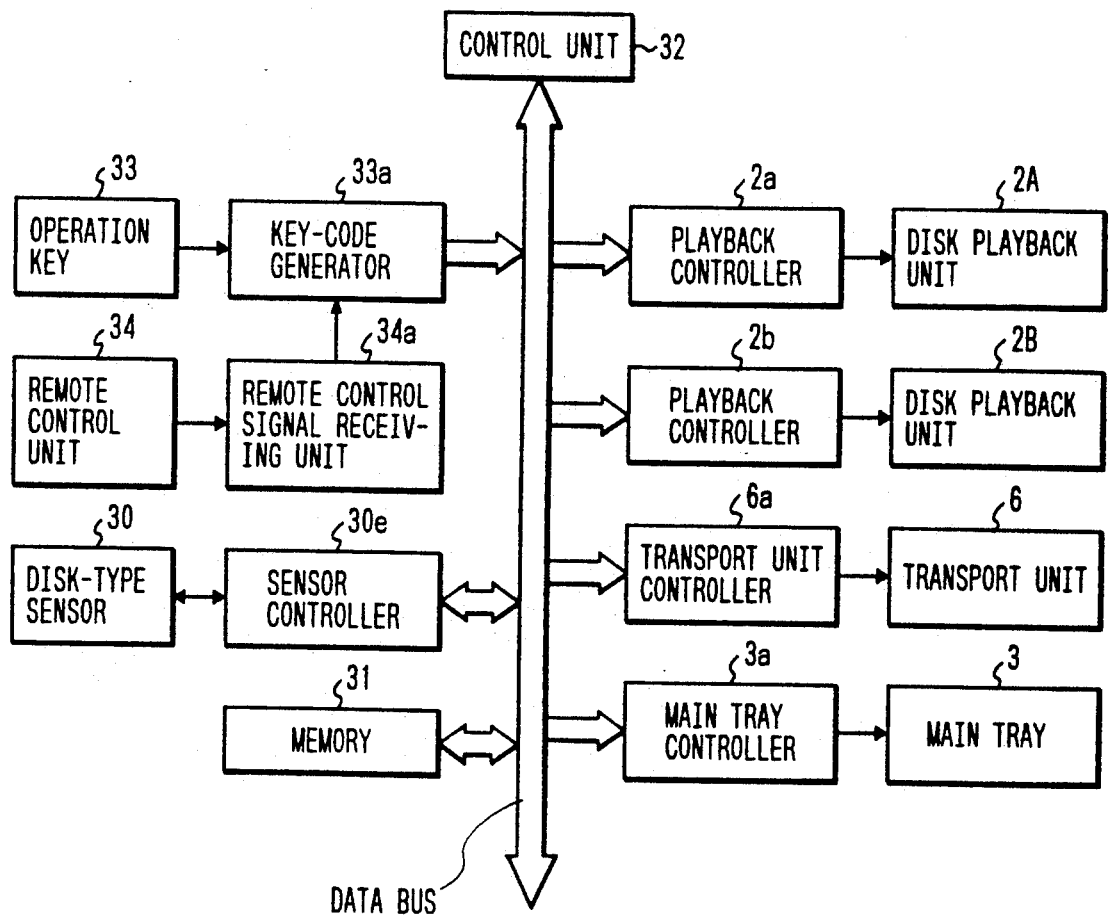

FIG. 8(b) is a block diagram showing a control system for controlling the operation of the disk player of FIG. 1. A control unit 32 is coupled through a data bus with playback unit controllers 2a and 2b, transport unit controller 6a, main tray controller 3a, key-code generator 33a, sensor controller 30e, and memory 31.

The upper disk playback units 2A and 2B, transport unit 6, main tray 3, and optical disk-type sensor 30 are respectively driven by the control signals output from the playback unit controllers 2a and 2b, transport unit controller 6a, main tray controller 3a, and sensor controller 30e.

The key-code generator 33a generates key-code data corresponding to an instruction mode entered by an operator using operation key 33, or corresponding to a remote control signal received by receiving unit 34.

The memory 31 stores the address of each disk in the container 5 and stores data indicative of the type of disk at that address.

Figure 10:
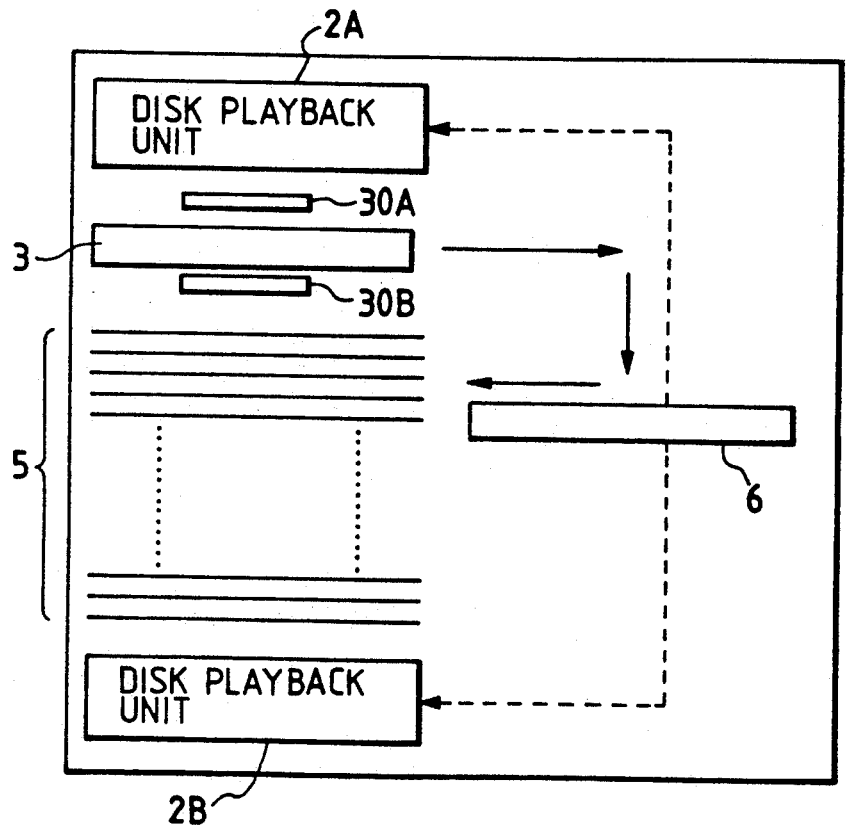
FIG. 10 is a diagrammatic view illustrating the operation of the transport unit within the disk player of FIG. 1.
Figure 11:
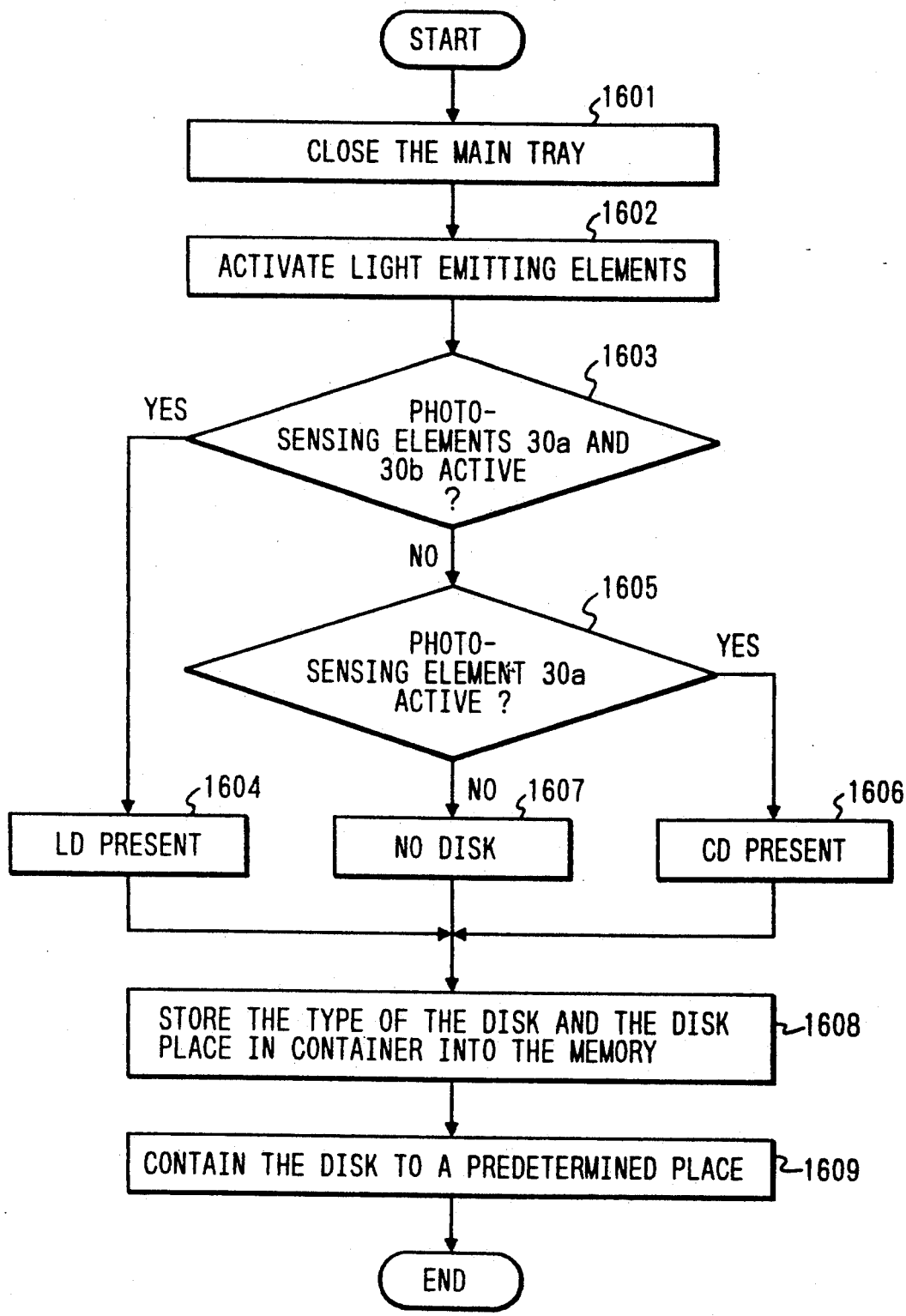
FIG. 11 is a flow chart illustrating the loading operation of the disk player in FIG. 1.

The operation of loading disks into an empty disk container 5 will now be described with reference to FIGS. 9 through 11.

Figure 9:
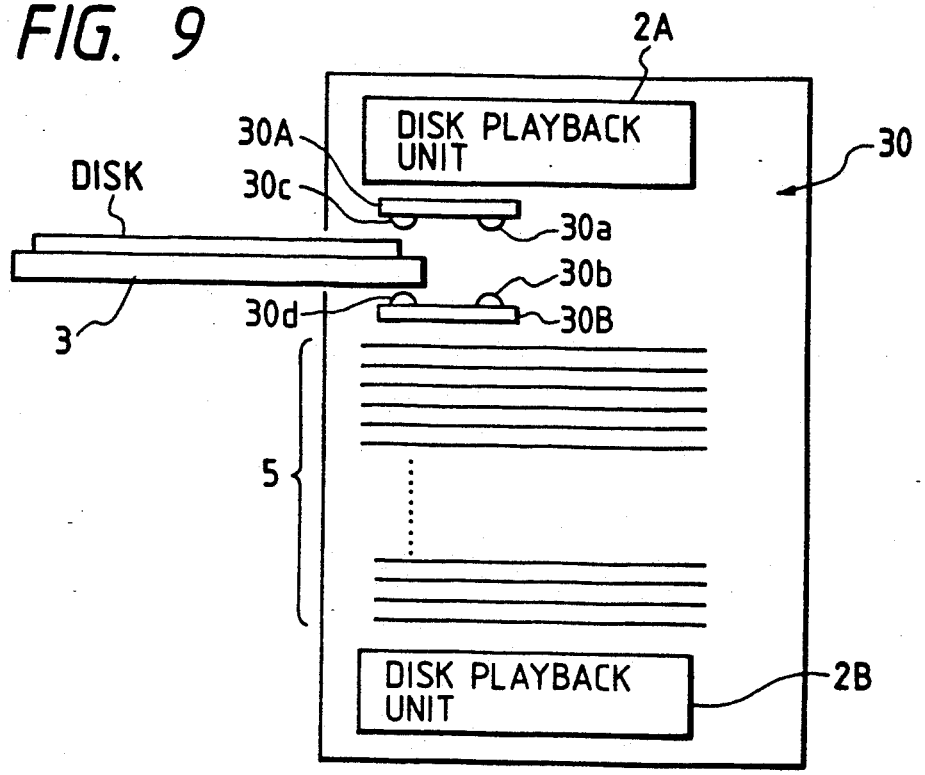
FIG. 9 is a diagrammatic view illustrating the loading operation of the disk player of FIG. 1.

In a loading state where the main tray 3 is extended from within the housing 1 as shown in FIG. 9, the operator sets a disk in sub-tray 4 and places the sub-tray on the main tray 3. During a loading operation, the main tray 3 is subsequently retracted into the housing (i.e., closed) until the main tray 3 moves under the upper disk playback unit 2A (step 1601, FIG. 11). At this time, the disk in the sub-tray 4 is located between the light-receiving part 30A and the light-emitting part 30B of the optical disk-type sensor 30 (as shown in FIG. 10).

In this position, the optical disk-type sensor 30 is driven under control of the control unit 32 so that the light-receiving elements 30a and 30c of the light-receiving part 30A output signals representative of the type of disk contained in sub-tray 4. Specifically, the light-emitting elements 30b and 30d positioned below the sub-tray 4 at points a and b, respectively, are activated to emit light in the direction of light-receiving elements 30a and 30c (step 1602). The type of the disk is determined by the control unit on the basis of the light detected by light-receiving elements 30a and 30c, in accordance with Table 1 above.

Thus, to determine the disk type, the outputs of light-receiving elements 30a and 30c are checked for active states (step 1603). If both elements output active signals, the control unit determines that the video disk (LD) is present (step 1604). When only the light-receiving element 30a outputs an active signal (step 1605), the control unit determines that the compact disk (CD) is present (step 1606). When neither the light-receiving elements 30a or 30c output active signals, however, the control unit determines that no disk is present (step 1607).

On the basis of the above determination process, the control unit 32 stores into memory 31 data indicative of the type of the disk detected, as well as the address of the disk position in the disk container 5 in which the disk will be stored (step 1608). After storing the data in the memory 31, the control unit 32 controls the transport unit 6 to remove the sub-tray 4 from the main tray 3 and to load the sub-tray 4 into the container 5 at the position corresponding to the address stored in memory. During the initial loading of an empty container 5, the position corresponds to an empty storage space within the container 5 (step 1609).

After the sub-tray 4 has been placed in the disk container, the main tray 3 is empty. The transport unit 6 then pulls another empty sub-tray 4 out of the disk container 5 and transfers it to the main tray 3, wherein the above process (FIG. 11) is repeated.

The above-described process may also be performed when a disk already stored in container 5 is replaced with a new one. In that case, the address of the position of the disk to be placed in the disk container 5 is designated by an operator and the transport unit 6 moves the designated disk out of the container 5 and onto the main tray 3. After the new disk is placed on the main tray 3 and the type of disk is detected, in the manner discussed above, the disk-type data is written over the data already stored in memory 31, and the disk is placed in the container 5.

Figure 13:
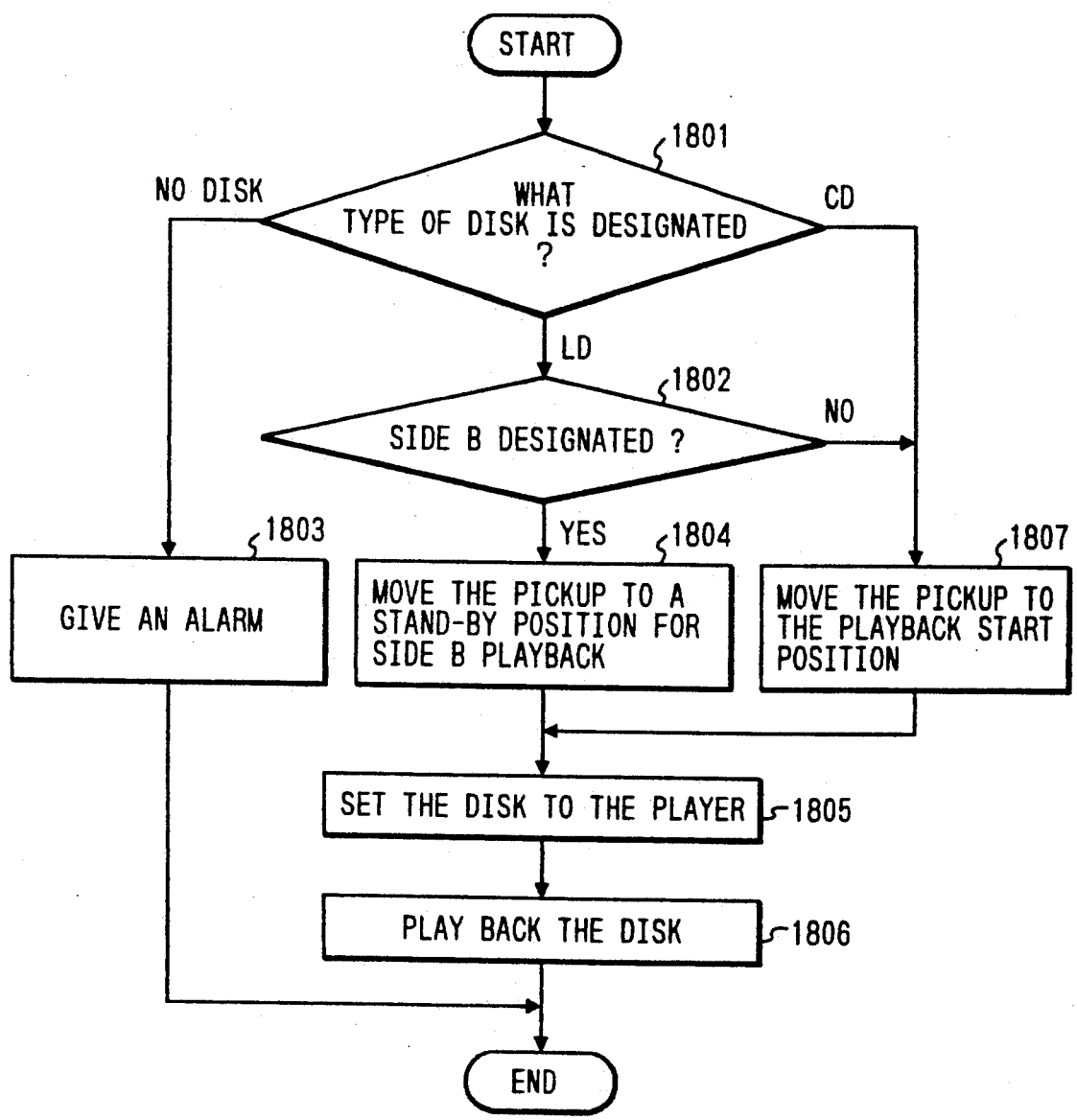
FIG. 13 is a flow chart illustrating the playback operation of the disk player of FIG. 1.

A playback operation will now be described with reference to FIGS. 12 and 13.

First, a disk number, disk side, and music number are designated by an operator using the operation key 33 or the remote control unit 34 (FIG. 8(b)). The control unit determines the type of the designated disk by using the data stored in the memory 31 (step 1801). If the disk is a video disk (LD), a pickup 40 (FIG. 12) is moved up to the playback start position set for LD-type disks along a guide shaft 41 in the radial direction of the disk (steps 1802, 1804, and 1807). If the designated disk is a compact disk (CD), the pickup 40 is moved up to the playback start position set for the CD-type disks along the guide shaft 41 and in the radial direction of the disk (step 1807).

When the control unit determines that no disk is present, however, an alarm is triggered which visually indicates the condition on a display section (not shown) or the like provided on the front surface of the housing 1 (step 1803). The alarm may also indicate the condition in other suitable ways, such as flickering of an indicator lamp or sounding of a buzzer, as well known in the art.

The LD or CD is set (or nipped) between the turntable 43 of a spindle motor 42 and a clamper 44 (step 1805). The turntable 43, driven by the spindle motor 42, increases the number of its revolutions per unit time. Immediately after a prescribed number of revolutions is reached, the playback operation of the disk begins (step 1806).

A position detecting operation of the transport unit 6 will now be described with reference to FIGS. 14, 15(a), and 15(b).

Figure 14:
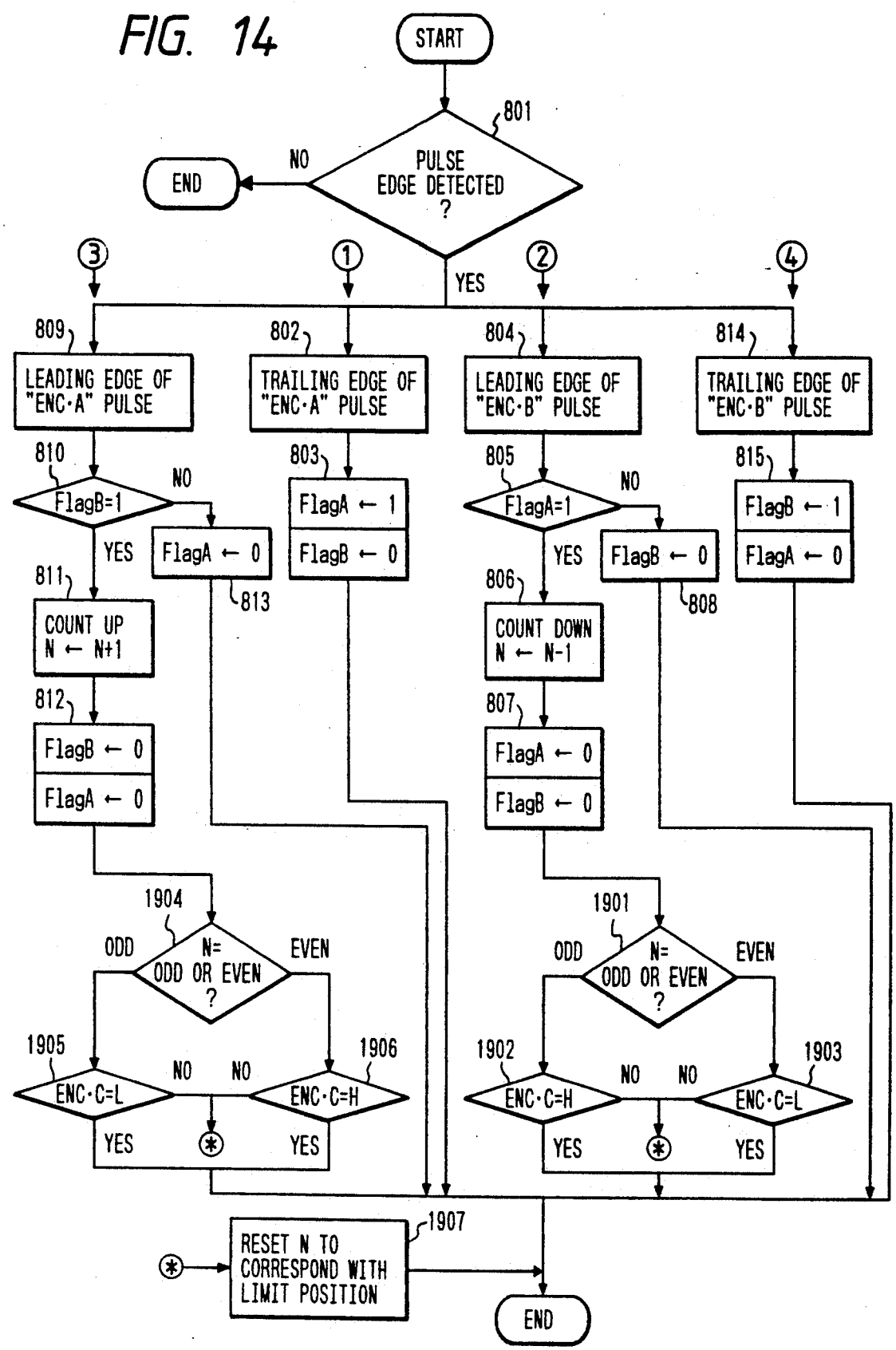
FIG. 14 is a flow chart illustrating the position detecting operation of the disk player shown in FIG. 1.
Figure 17A:
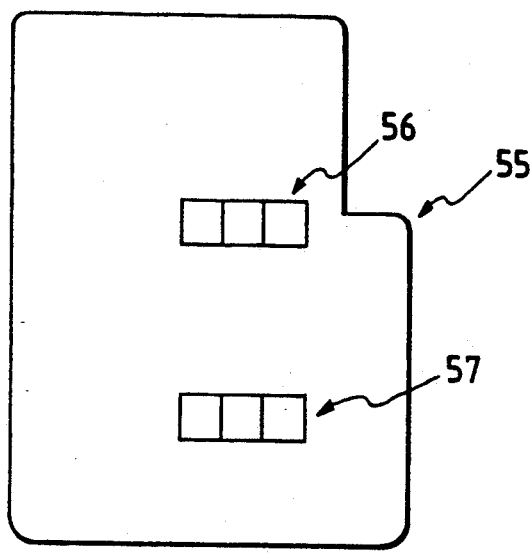
FIGS. 17(a) and 17(b) show front views of an encoder unit and an encoder channel, which cooperate to form the position detecting apparatus of FIG. 16.
Figure 17B:
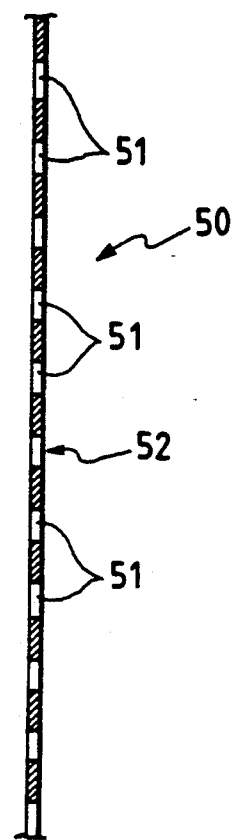
Figure 18:
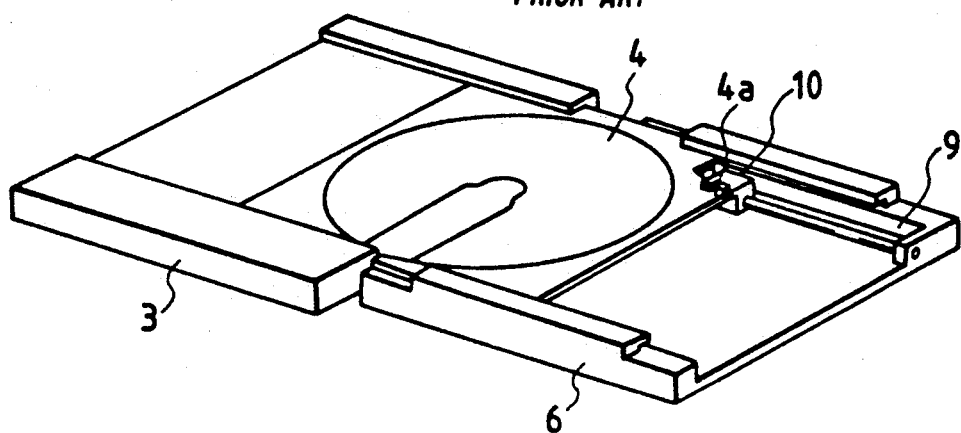
FIG. 18 is a perspective view showing a transport unit used in the apparatus of FIG. 16.
Figure 21:
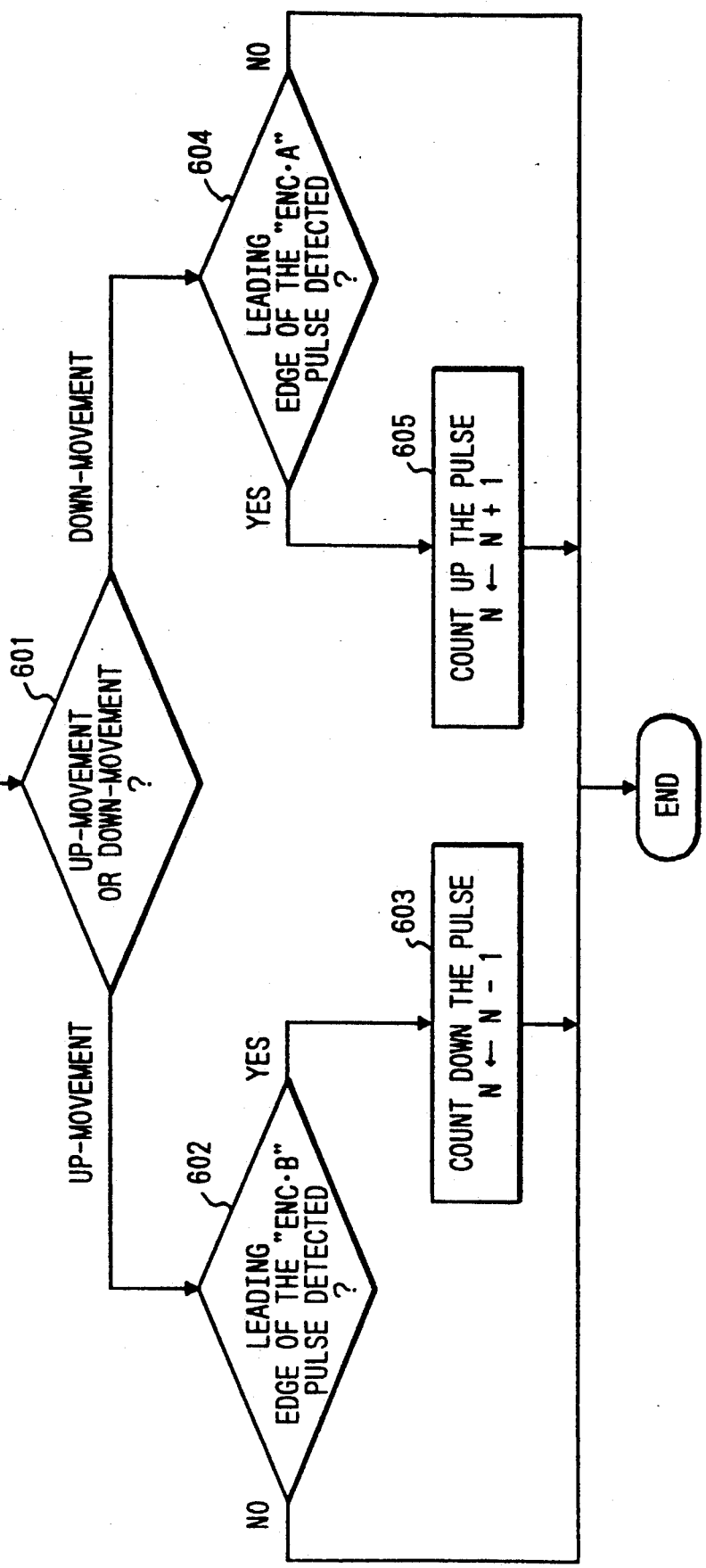
FIG. 21 is a flow chart illustrating the position detecting operation for the apparatus shown in FIG. 16.
Figure 23:
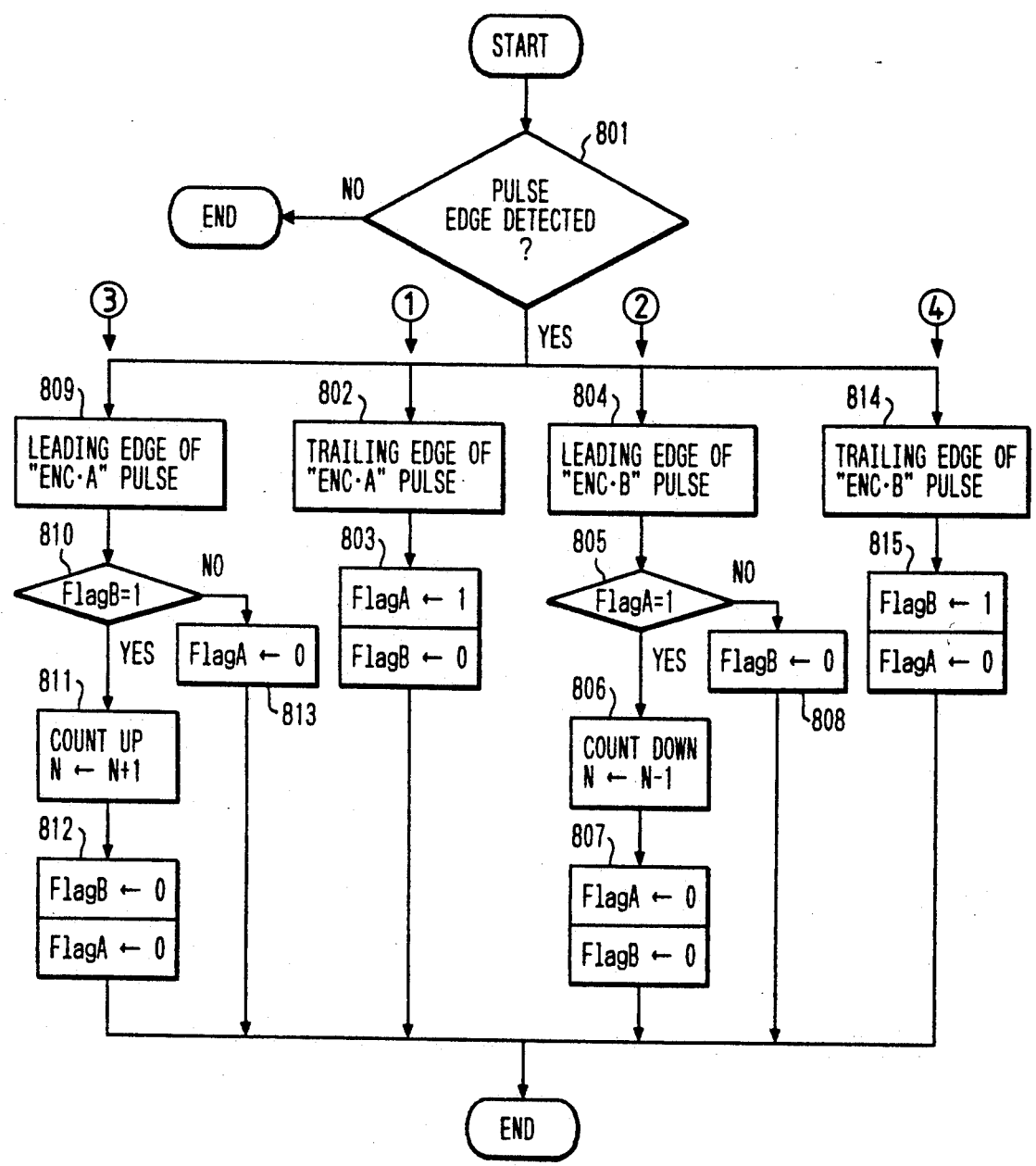
FIG. 23 is a flow chart illustrating another position detecting operation for the apparatus of FIG. 16.

In the flow chart shown in FIG. 14, the same or equivalent blocks as those in FIG. 23 are illustrated and therefore need not be described. In FIGS. 15(a) and 15(b), the low level and the high level of the pulse output by the ENC.C are respectively denoted as "even" and "odd" portions of the pulse output. The "even" and "odd" levels each correspond to even and odd number values of the count (N) stored in the counter 63.

When the transport unit 6 starts to move upward from a stop position S, shown by a double-dotted dashed line in FIG. 15(a), the pulse edge first detected by the control unit is the trailing edge of the pulse output by ENC.A. When this trailing edge is detected (steps 801 and 802), flag A is reset to "1" (flag A="1") and flag B is set to "0" (flag B="0"). The leading edge of the output pulse of the ENC.B next arrives. When the leading edge of ENC.B is detected (step 804), the control unit discriminates the edge of the preceding pulse (i.e., the ENC.A pulse). If the control unit in step 805 determines that flag A is not equal to "1," the counter 63 remains unchanged and flag B is set to "0" (step 808).

If flag A="1" (step 805), the count (N) stored in counter 63 is decremented (step 806). After the count is decremented, both flags A and B are reset to "0" (flag A="0" and flag B="0") (step 807). The control unit then determines whether the count stored in the counter 63 is an "even" or an "odd" number (step 1901). If the control unit determines that the count is an "odd" number, then the control unit determines whether the level of the pulse output from the ENC.C at the time is at the level corresponding to an "odd" number position count during upward movement of the transport unit 6 (FIG. 15(a)). In the instant case, if the pulse is at an H level (step 1902), the control unit recognizes that the count (N) stored in the counter 63 at the present time is the correct position count.

If the control unit determines in step 1902 that the ENC.C pulse is at an L level, however, the control unit recognizes that an output pulse has not been properly counted (i.e., an output pulse is missing), as shown in FIG. 22(a). As the position count no longer indicates the actual position of the transport unit 6, the control unit moves the transport unit 6 to the upper limit position in the housing 1. When the transport unit 6 reaches the upper limit position, the position of the transport unit 6 is detected by the limit switch 65 and the counter 63 is set to the upper limit position address (step 1907). (It should be noted that in the case where a missing pulse is detected as the transport unit moves downward in the housing 1, the transport unit 6 is moved to the lower limit position.) With the proper count (N) loaded in the counter 63, the transport unit 6 can again be moved towards the designated address.

When the control unit determines in step 1901 that the count (N) stored in the counter 63 is an "even" number that in step 1903 the ENC.C pulse is at an L level, the control unit determines that the position count (N) stored in counter 63 is correct.

Following the leading edge of the ENC.B pulse, the leading edge of the ENC.A pulse arrives. When the edge of this pulse is detected (step 809), the control unit determines whether or not flag B is set to "1" (step 810). When flag B="0," the control unit sets flag A to "0" (step 813) and detects the edge of the next pulse output.

The trailing edge of the ENC.B pulse appears after the leading edge of the ENC.A pulse. When this edge of the ENC.A pulse is detected (step 814), flag A is set to "0" and flag B is set to "1" (step 815).

Thus, in the upward movement of the transport unit 6, flag A="1" and flag B="0" are set every time the trailing edge of the ENC.A pulse is detected. Only when flag A="1" and the level of the output pulse of the ENC.C is coincident with the "even" or "odd" number of the count (N) stored in the counter 63 does counter 63 contain the correct position count. When the correct position count is coincident with a designated address, the movement of the transport unit 6 is stopped.

When the transport unit 6 starts to lower from the stop position S, enclosed by a double-dotted dashed line in FIG. 15(b), the trailing edge of the ENC.B pulse is first detected. When it is detected (steps 801 and 814), flag B is set to "1" and flag A is set to "0" (step 815). The leading edge of the ENC.A pulse is next detected in step 809. When the leading edge is detected, the state of flag B representing the edge state of the preceding pulse is determined (step 810). If the control unit in step 810 determines that flag B is not "1," the count (N) remains unchanged and flag A is set to "0" (step 813). If flag B had been set to "1," the count (N) stored in counter 63 is incremented (step 811). After the count is incremented, flags A and B are reset to "0" (step 812). The control unit then determines whether the count (N) stored in counter 63 is an "even" or an "odd" number (step 1905). If the ENC.C pulse is at an L level, the control unit recognizes that the count (N) in counter 63 is correct. When the control unit in step 1904 determines that the count (N) in the counter 63 is an "even" number and the ENC.C pulse is at an H level (step 1906), the control unit recognizes that the count (N) is correct.

However, if the control unit in step 1904 determines that the ENC.C pulse is at an H level when the count (N) is "odd," an output pulse has not been properly counted (i.e., the pulse is missing) and the actual position of the transport unit is not properly represented by the position count. As a result, the control unit causes the transport unit 6 to move downward towards the lower limit position. When the transport unit 6 reaches the lower limit position, its position is detected by the limit switch 65. On the basis of such detection, the count (N) of the counter 63 is set to the lower limit position address (step 1907). With the proper count (N) loaded in the counter 63, the transport unit 6 can again be moved towards the designated address.

In the case where the count (N) was correct, the control unit detects the next pulse output. The leading edge of the ENC.B pulse arrives after the leading edge of the ENC.A pulse. When the edge of the pulse is detected (step 804), the control unit checks whether or not flag A is "1" (step 805). In this instance, in step 812, flag A had been reset to "0." Thus, the control unit sets flag B to "0" (step 808), and the edge of the next pulse is detected.

After the leading edge of the ENC.B pulse, the trailing edge of the ENC.A pulse arrives. When the edge of this pulse is detected (step 802), flag A is set to "1" and flag B is reset to "0." Then the control unit detects the edge of the next pulse output.

Thus, during the downward movement of the transport unit 6, every time the trailing edge of the ENC.B pulse is detected, flag A is reset to "0" and flag B is set to "1." Only when flag B="1" and the level of the output pulse of the ENC.C is coincident with the "even" or "odd" number of the count (N) in the counter 63 is the count (N) a correct indication of position of the transport unit 6. When the count is coincident with a designated address, the movement of the transport unit 6 is stopped.

As described above, the present invention is a position detecting apparatus that accurately and reliably detects the position of a transport unit for transporting disks in a disk player or the like. The present invention counts the number of pulses output by an encoder of the transport unit as the unit moves upward or downward along an encoder channel. A missing pulse output can readily be detected using the present invention notwithstanding application of external force, such as a vibration, and notwithstanding other factors, such as dust contained in the encoder channel, that render the conventional position detecting apparatus in effective.

What is claimed is:

1. A method of detecting a position of a movable transport unit, said transport unit comprising a first encoder channel having a plurality of recesses formed therein; a second encoder channel having a plurality of recesses formed therein; a first sensor, coupled to said transport unit that traverses in a direction parallel to said first encoder channel as the transport unit passes over said first encoder channel, said first sensor respectively generating pulse signals in response to passing said recesses formed in said first encoder channel; and a second sensor, coupled to said transport unit, that traverses in a direction parallel to said second encoder channel, said second sensor respectively generating pulse signals in response to passing said recesses formed in said second encoder channel, the method comprising the steps of:
   accumulating the number of pulses output by said first sensor as a position count, and storing the position count as a representation of the position of the transport unit along said first encoder channel; and
   determining the position count as a valid indication of the position of the transport unit in response to the level of the pulse output from said second sensor.

2. The method of detecting a position as recited in claim 1, wherein the plurality of recesses formed in said first and second encoder channels are uniformly spaced at prescribed distances, the plurality of recesses in said second encoder channel having a wider pitch relative to the recesses in said first encoder channel, said method further comprising the step of generating alternating signal levels of high (H) and low (L) polarities from said second sensor that correspond respectively to an odd and even number of recesses in said first encoder channel as accumulated as the position count in said accumulating step.

3. The method of detecting a position as recited in claim 2, wherein the position count is valid when the count represents an odd number and the level of the pulse output from said second sensor is high.

4. The method of detecting a position as recited in claim 3, further comprising the steps of moving the transport unit along said first encoder channel until the transport unit reaches a predetermined position, and resetting said position count to a count corresponding to the predetermined position, wherein said steps of moving and resetting are performed only when it is determined that the position count is not valid.

5. The method of detecting a position as recited in claim 4, wherein said transport unit transports disks from a disk storage container to a disk playback unit in a disk player.

6. A position detecting apparatus for detecting a position of a movable transport unit used to transport a recording medium along a track serving a storage container and at least one playback unit, the apparatus comprising:
   a first encoder channel having a plurality of recesses formed therein, said first encoder channel being positioned along said track;
   a first sensor, coupled to said transport unit such that the sensor traverses the length of said first encoder channel as said transport unit moves along said track, said first sensor respectively generating pulse signals in response to passing said recesses formed in said first encoder channel;
   a second encoder channel having a plurality of recesses formed therein, said second encoder channel being positioned along said track;
   a second sensor, coupled to said transport unit such that the sensor traverses the length of said second encoder channel as said transport unit moves along said track, said second sensor respectively generating pulse signals in response to passing said recesses formed in said second encoder channel;
   a counter accumulating and storing the number of pulses output by said first sensor as a position count, said position count representing the position of the transport unit along said track; and
   a control unit determining that the position count is a valid indication of the position of the transport unit in response to the level of the pulse signals output from said second sensor.

7. A position detecting apparatus as recited in claim 6, wherein the plurality of recesses formed in said first and second encoder channels are uniformly spaced at prescribed distances, the plurality of recesses in said second encoder channel having a wider pitch relative to the recesses in said first encoder channel, and wherein the wider pitch of the recesses in said second encoder channel cause said second sensor to generate alternating signal levels of high (H) and low (L) polarities that correspond respectively to an odd and even number of recesses in said first encoder channel as accumulated by said counter.

8. A position detecting apparatus as recited in claim 7, wherein the position count is valid when the count represents an odd number and the level of the pulse output from said second sensor is high.

9. A position detecting apparatus as recited in claim 8, further comprising a limit switch located at a predetermined position along said track, wherein when the position count of said counter is not determined to be valid, the transport unit moves along said first encoder channel until it reaches the predetermined position as detected by said limit switch and a count corresponding to the predetermined position is set in said counter to indicate the position of said transport unit at the predetermined position.

10. A position detecting apparatus as recited in claim 9, wherein the recording mediums transported by said transport unit are disks to be reproduced in said playback unit.

11. A position detecting apparatus comprising:
   position detecting means, provided in parallel with an encoder channel having a plurality of recesses arrayed at prescribed intervals, for generating a periodic binary coded signal in synchrony with the prescribed intervals as the position detecting means moves along said channel;

a counter means for counting the number of recurrences of a specific phase point of said binary coded signal, and for storing the number as a position count representative of the position of said position detecting means along said channel;

pulse train generating means for generating a train of pulses whose levels are alternately inverted in synchrony with the recurrences of said specific phase point of said binary coded signal; and check means, responsive to the level of said pulse train and an odd/even condition of the position count of said counter, for determining the validity of the position count as a valid representation of the position of the position detecting means.

12. A position detecting apparatus as recited in claim 11, further comprising a second encoder channel, parallel with said encoder channel, also having a plurality of recesses arrayed at prescribed intervals, wherein the plurality of recesses formed in both encoder channels are uniformly arrayed at prescribed intervals, the plurality of recesses in said second encoder channel having a wider pitch relative to the recesses in said encoder channel, and wherein the wider pitch of the recesses in said second encoder channel cause said pulse train generating means to generate alternating signal levels of high (H) and low (L) polarities that correspond respectively to an odd and even number of recesses in said encoder channel as stored in said counter means.

13. A position detecting apparatus as recited in claim 12, wherein the position detecting means is coupled to a disk transport unit for transporting disks from a storage container to a disk playback unit.

14. A position detecting apparatus as recited in claim 12, wherein said pulse train generating means is an optical sensor coupled to said position detecting means and movable along said second encoder channel.

* * * * *